United States Patent [19]

Hise et al.

[11] Patent Number: 5,021,232
[45] Date of Patent: Jun. 4, 1991

[54] SULFUR RECOVERY PROCESS

[75] Inventors: Ralph E. Hise, Shaker Heights; W. Jeffrey Cook, Cleveland Heights, both of Ohio

[73] Assignee: CNG Research Company, Pittsburgh, Pa.

[21] Appl. No.: 415,100

[22] Filed: Sep. 29, 1989

[51] Int. Cl.$^5$ .......................... C01B 17/04; F25J 3/06
[52] U.S. Cl. .................................... 423/574 R; 62/12
[58] Field of Search ............... 423/DIG. 11, DIG. 9, 423/DIG. 6, 574 R, 576.8; 62/11, 12; 55/23, 73, 82

[56] References Cited
U.S. PATENT DOCUMENTS

| | | | |
|---|---|---|---|
| 4,153,674 | 5/1979 | Verloop et al. | 423/574 R |
| 4,169,133 | 9/1979 | Staege | 423/220 |
| 4,263,270 | 4/1981 | Groenendaal et al. | 423/574 R |
| 4,270,937 | 6/1981 | Adler et al. | 62/12 |
| 4,406,873 | 9/1983 | Beavon | 423/574 R |
| 4,581,052 | 4/1986 | Adler et al. | 62/535 |
| 4,609,388 | 9/1986 | Adler et al. | 62/12 |
| 4,620,967 | 11/1986 | Tippmer | 423/574 R |
| 4,623,372 | 11/1986 | Adler et al. | 62/535 |

Primary Examiner—Jeffrey E. Russel
Attorney, Agent, or Firm—Pearne, Gordon, McCoy & Granger

[57] ABSTRACT

A sulfur recovery process including a Claus reaction wherein sulfur-containing compounds are converted to elemental sulfur in the presence of a stoichiometric excess of hydrogen sulfide. The sulfurous compounds in the tail gas of the Claus reaction are separated for recycle using crystallization. Liquid carbon dioxide absorption is used to separate substantially all sulfur-containing compounds from a residual tail gas suitable for venting to the atmosphere.

36 Claims, 5 Drawing Sheets

SULFUR RECOVERY PROCESS

BACKGROUND OF THE INVENTION

This invention relates generally to sulfur recovery processes and more particularly to an improved Claus process and to a process for cleanup of sulfur-containing constituents in a gaseous stream such as a tail gas from a sulfur recovery unit (SRU).

The recovery of sulfur and cleanup of sulfur-containing constituents or compounds in a gaseous stream may be economically and/or environmentally motivated. The Claus process is widely used for the recovery and production of elemental sulfur from acid or sour gas streams also containing hydrogen sulfide in admixture with carbon dioxide. Additional sulfur-containing compounds which may be present or otherwise encountered or formed in the process include sulfur dioxide, carbonyl sulfide and carbon disulfide. The acid gas streams usually also contain small amounts of hydrocarbons ranging from methane to butane and even higher molecular weight hydrocarbons.

In most Claus processes, an initial thermal reaction zone or reactor is used with the addition of an oxidant such as air to react hydrogen sulfide to sulfur. In addition, sulfur dioxide and water are formed. Following separation of the sulfur product, the gases from the thermal reaction zone are passed through one or more catalytic reactors or stages wherein sulfur dioxide is reacted with hydrogen sulfide over alumina or bauxite catalysts to produce additional sulfur. As the inert content of the acid gas stream increases, the thermal reaction becomes unstable and preheating or diverting of a portion of the acid gas feed around the thermal reactor is required in modified Claus processes. Thus, the conversion of contaminants to sulfur and the percent of sulfur recovery in such processes are limited by the Claus reaction thermodynamics or kinetics.

The Claus process is sensitive to variations in the feed rate of the acid gas stream and relatively minor variations in upstream units tend to amplify in the Claus plant, "Claus Processing of Novel Acid Gas Streams", Beavon, David K., Symposium on Sulfur Recovery and Utilization, presented before the division of Petroleum Chemistry, Inc., American Chemical Society, Atlanta meeting, Mar. 29–Apr. 3, 1981. In acid gas streams containing relatively high proportions of inerts, e.g. carbon dioxide, the bypass of the thermal reactor is prohibited when even traces of olefins or aromatics are present since they react to form tarry products which foul the catalyst and discolor the sulfur, Beavon, supra.

The Claus process as described above removes about 93–96% of the originally present sulfur and generally requires an accompanying tail gas cleanup process and plant process equipment to remove the unreacted sulfurous compounds, primarily sulfur dioxide and hydrogen sulfide together with lesser amounts of carbonyl sulfide and carbon disulfide. Known tail gas cleanup techniques may increase the overall recovery to 99.5–99.6% without meeting recent emission standards in the range of 100 ppm and less. The costs of such tail gas cleanup plants often exceed the cost of the Claus plant for bulk sulfur recovery, and therefore the plants may be based on emission standards rather than economics.

Considerable effort has been expended to develop economical and effective tail gas cleanup processes. An early survey of prior processes is provided in "Current Claus Tail Gas Cleanup Processes", by B. Gene Goar, as presented at the Fifty Seventh Annual Convention of the Gas Processors Association, 1978. This survey is updated in "Emerging New Sulfur Recovery Technologies", by B. Gene Goar, Proceedings of the Gas Conditioning Conference, page 87, Mar. 6–8, 1989. Certain of these processes include conversion of the sulfur-containing compounds in the tail gas to a single species prior to absorption thereof. The advantages of conversion to a single sulfur species prior to water removal is discussed in U.S. Pat. Nos. 3,752,877 and 4,426,369. The Shell Claus Offgas Treating (SCOT) process is considered to be one of the most flexible processes available. In such process, all of the sulfurous compounds are converted to hydrogen sulfide and in a final stage selectively absorbed with an alkanolamine solution. The purified tail gas for venting contains about 200–500 ppm hydrogen sulfide which must be incinerated to sulfur dioxide before venting. This exceeds some current emission standards and may restrict use of the process. As reported by Goar, supra, the captial cost of the SCOT plant may equal the cost of the parent Claus plant in an "add-on" application and equals about 75–80% of the Claus cost in an integrated new plant.

Pending patent application U.S. Ser. No. 234,864, filed Aug. 19, 1988, which is owned by the assignee herein, discloses an improved tail gas cleanup process wherein only a single thermal or catalytic reactor or reaction stage is used in a Claus reaction. The relatively high concentrations of unreacted The relatively high concentrations of unreacted hydrogen sulfide and sulfur dioxide resulting from the use of a single reactor stage are recovered with conversion to sulfur dioxide by incineration and concentrated by absorption and crystallization processes for recycle in such process. More particularly, a liquid carbon dioxide absorbent is used to remove contaminant sulfur-containing components which are thereafter separated for recycle. In this manner, substantially all sulfur-containing compounds are removed from the tail gas to provide sulfur dioxide for use in the Claus reaction. The sulfurous compounds in the feed stream to the Claus reactor are concentrated by crystallization or distillation prior to or following combination with the recycle stream.

SUMMARY OF THE INVENTION

In accordance with the present invention, an improved sulfur recovery process is provided. The process contemplates a Claus reaction wherein sulfur-containing compounds are converted to elemental sulfur in the presence of a stoichiometric excess of hydrogen sulfide. The elemental sulfur is separated from a tail gas containing sulfurous compounds. The sulfurous compounds in the tail gas are concentrated as an excluded material in a crystallization separation process and recycled to the Claus reaction to enable recovery of substantially all of the sulfur originally present in the process feed stream being tested.

The sulfur-containing compounds in the tail gas are effectively separated by crystallization for recycle to extinction. In this manner, the present process enables substantially 100% recovery, free of limitation by the Claus reaction thermodynamics or kinetics.

A crystallizable liquid including at least a portion of the sulfur-containing compounds in the tail gas is provided for use in the crystallization process. The sulfur-containing compounds and other contaminants present in the tail gas following the removal of any water may provide a suitable crystallizable liquid. Alternatively, the sulfur-containing compounds in the tail gas may be absorbed in a physical absorbent which together with the absorbed compounds provides the liquid phase.

In the processing of acid or sour gas streams, carbon dioxide is typically present and it may be separated as the high purity solid phase in the crystallization process. Lower boiling constituents such as nitrogen or hydrogen are stripped of sulfur-containing compounds in an absorption process using a high purity liquid carbon dioxide absorbent. In such a combined absorption and crystallization process, liquid carbon dioxide also effectively removes sulfur dioxide, carbonyl sulfide and carbon disulfide present in the gas stream to thereby enable a vent gas which is substantially free of sulfur contamination.

The combination of the recycle stream from the crystallization process with the process feed stream being treated provides a Claus feed stream having an increased concentration of sulfur-containing compounds in many applications. This tends to stabilize the Claus reaction and to avoid feed gas preheating or diverting techniques. Crystallization processing of the feed gas also tends to isolate the Claus reaction from feed rate variations due to upstream processing.

As compared with a prior art Claus plant and SCOT combination for processing an identical feed gas, the recovery process in accordance with the invention has a lower capital cost and operating energy requirement based on present economic analysis. Furthermore, the present process substantially eliminates sulfur emissions and affords improved Claus operations. The present process is also advantageous since it avoids incineration of sulfur-containing compounds and the additional operating fuel costs and apparatus costs thereof.

As indicated above, liquid carbon dioxide is a physical absorbent for hydrogen sulfide as well as other sulfur-containing compounds. Liquid carbon dioxide removes carbonyl sulfide and carbon disulfide even more effectively than hydrogen sulfide. Thus, a flow of liquid carbon dioxide sufficient to remove all of the hydrogen sulfide present in the gas stream will also remove all of the carbonyl sulfide and carbon disulfide present. The recycle of these contaminants promotes their conversion in the Claus reaction since their concentration is limited by the reaction equilibrium. This is especially advantageous herein since it is difficult to convert these contaminants to sulfur in conventional sulfur recovery processes. The absorption process itself is further described in U.S. Pat. Nos. 4,270,937 and 4,609,388 which are owned by the assignee herein.

In the crystallization process, carbon dioxide is the crystallizable material and the sulfur-containing compounds are at least partially excluded from a solid phase which contains the crystallizable material and which is obtained upon freezing a liquid phase of the materials. The crystallization process may be performed in multiple processing vessels wherein solid carbon dioxide is alternately formed and melted at non-triple point conditions as described in U.S. Pat. No. 4,609,388, supra. Preferably, the crystallization is performed in a continuous separation cascade at temperatures and pressures near the triple point of carbon dioxide such that vapor, liquid and solid phases coexist nearly in equilibrium. Solid phase is formed by evaporative cooling of a liquid mixture of the materials. The solid is melted by direct contact with a condensing vapor of the materials while immersed in the liquid mixture or after separation from the liquid by conveyance to a drained bed of solids above the liquid mixture. Such triple point crystallization processes are described in greater detail in U.S. Pat. Nos. 4,581,052 and 4,623,372 which are owned by the assignee herein.

The concentration of the excluded material may be facilitated by combination of vapor-liquid equilibrium separation techniques with the crystallization process. More particularly, one or more vapor-liquid separation stages may be combined in series with the crystallizer in order to further concentrate the exclude material in a more energy efficient manner.

DETAILED DESCRIPTION OF THE DRAWINGS

The invention is now described in greater detail with reference to the recovery of sulfur and cleanup of effluent or tail gas to provide a purified residual tail gas or vent gas suitable for discharge to the atmosphere. For illustrative purposes, a sour gas process feed stream consisting of 78.6% hydrogen sulfide, 17% carbon dioxide and 4.4% $H_2O$ on a molar basis is assumed. In addition, trace amounts of $C_1$-$C_4$ hydrocarbons, carbonyl sulfide, carbon disulfide and mercaptanes may be present.

A process feed gas stream having the foregoing composition may be received from natural gas cleanup processing at a temperature of 35° C. and a pressure substantially equal to atmospheric pressure. In such case, the Claus reaction may be performed at atmospheric pressure and the tail gas may be subsequently compressed to a pressure near the triple point pressure of carbon dioxide for crystallization processing or such other pressure as is required for pre-crystallization processing. If the feed gas is received at a high pressure, the Claus reaction may be performed at such pressure in order to minimize or eliminate downstream compression requirements.

Figure 1:
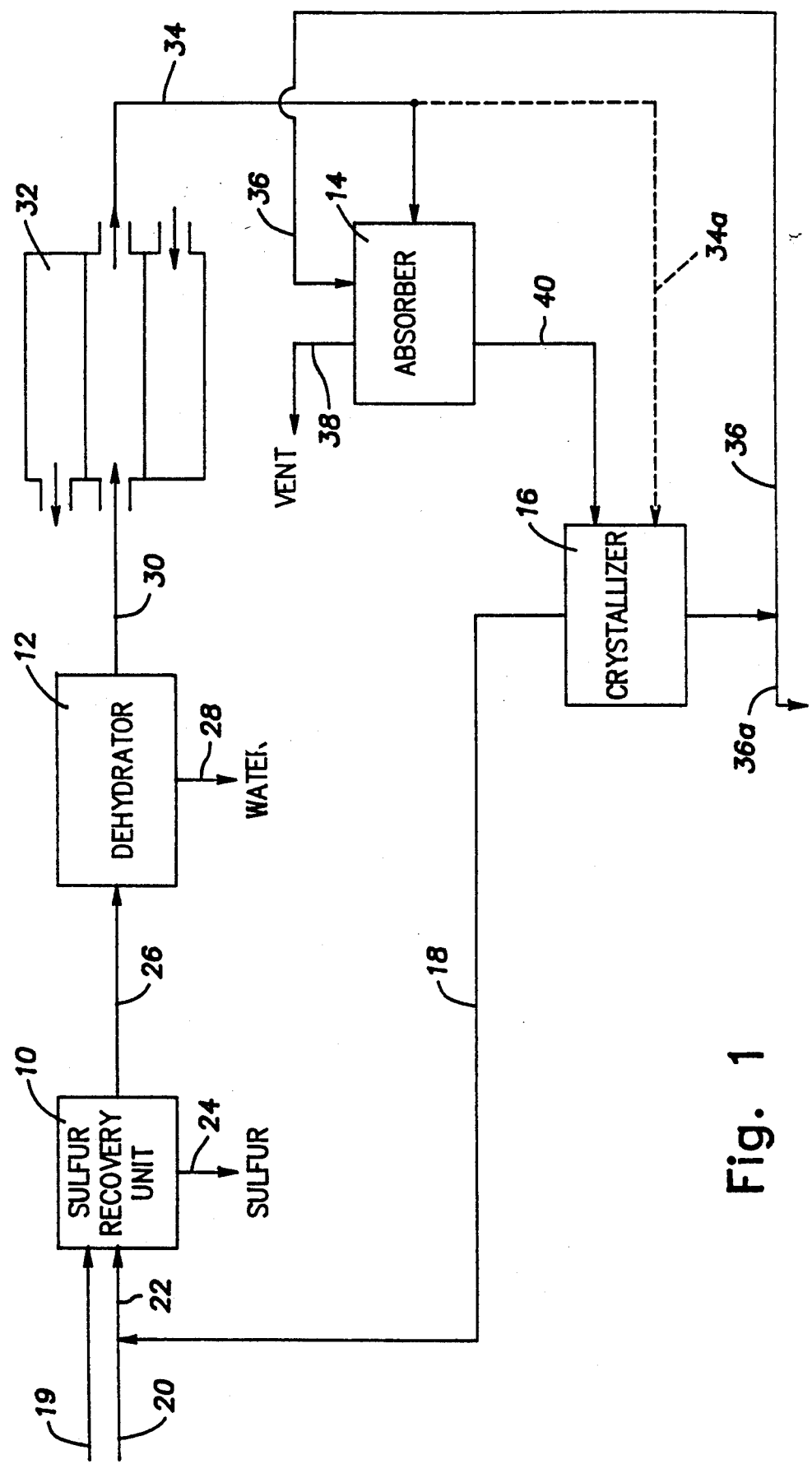
FIG. 1 is a simplified process flow diagram showing a sulfur recovery process comprising a Claus process and tail gas cleanup process in accordance with the present invention.

Referring to FIG. 1, a simplified process flow diagram for treatment of the process feed gas stream in a Claus process including tail gas cleanup in accordance with the present invention is shown. The major process steps or apparatus are schematically illustrated in FIG. 1 and include a sulfur recovery unit (SRU) 10 for producing and condensing elemental sulfur, a dehydrator 12 for removal of water from a tail gas from the SRU 10, an absorber 14 for separation of lower boiling constituents from sulfur-containing compounds, and a triple point crystallizer 16 for recovering and concentrating the sulfur-containing compounds in the feed to the SRU 10 by means of a recycle stream in line 18 and generating high purity liquid carbon dioxide absorbent as discussed below.

The process feed stream in the line 20 is combined with the recycle stream in line 18 including unreacted or unconverted sulfur-containing compounds to produce a Claus feed stream flowing in line 22 to the SRU 10. The Claus feed stream contains about 80.3% sulfur-containing compounds on a molar basis. In this example, hydrogen sulfide is the only sulfur-containing compound present in a significant amount in the recycle stream in line 18 and it is present at about a 78.6% concentration. Other sulfur-containing compounds comprise about 1.7% sulfur dioxide and trace amounts of the above-noted additional contaminants.

An oxidizing agent such as air or enriched air which is 95% oxygen and 5% nitrogen is added to the SRU 10 via line 19. Enriched air of the foregoing composition is used herein.

The SRU 10 contains a single thermal reaction stage for converting the sulfur-containing compounds in the feed stream to elemental sulfur and a tail gas including unconverted sulfur-containing compounds. In the single reaction stage, conversion to elemental sulfur will be in the range of 50-85% of the sulfur present in the Claus feed gas stream in line 22. (Of course, substantially 100% of the sulfur originally present in the process feed gas stream in line 20 is converted.) In applying the present invention to an existing Claus process, one or more catalytic reaction stages may be maintained, but such are not necessary to the Claus reaction process herein. Upon cooling, the elemental sulfur is condensed and withdrawn from the SRU 10 through line 24.

As indicated above, the Claus feed contains a stoichiometric excess of hydrogen sulfide. The formation of sulfur dioxide is thereby suppressed in accordance with the Claus reaction equilibrium equation:

$$\frac{[S_n]^{3/n}[H_2O]^2}{[H_2S]^2[SO_2]} = K$$

The concentration of sulfur dioxide is reduced in accordance with the second power of the excess concentration of hydrogen sulfide. Accordingly, hydrogen sulfide will be the primary sulfur-containing compound in the tail gas since at least about 70% of the sulfur-containing compounds will be hydrogen sulfide. The sulfur-containing compounds in the tail gas may comprise up to about 99% hydrogen sulfide so that it is essentially the only sulfur-containing compound present.

A tail gas containing about 48% of the sulfur originally present in the Claus feed gas in line 22 is withdrawn from the SRU 10 through line 26. The use of one or more additional reaction stages will tend to increase the percent of sulfur-containing compounds converted to sulfur as the gas flows through the SRU 10 and reduce the recycle stream flow. However, this is not necessary since essentially all of the sulfur-containing compounds in the tail gas are separated and recycled to the SRU 10 to enable recovery of 100% of the sulfur-containing compounds contained in the process feed gas stream in line 20. Accordingly, unless such additional stages are already present in a retro-fit application of the present invention, the use of the same is typically rejected based upon consideration of capital investment and operating energy costs.

The use of a single stage in the SRU 10 also illustrates the application of the tail gas cleanup process to gas streams of relatively high sulfur content. In contrast with known prior art tail gas cleanup processes which are designed to recover typically 2% of the sulfur originally present in the SRU feed gas, the present tail gas cleanup process is not so limited. As indicated, the limitation is really determined by economics.

As indicated, the SRU 10 includes a cooling portion to condense the elemental sulfur formed in the Claus reaction. The condensed sulfur is withdrawn through line 24. Any elemental sulfur contained within the tail gas leaving the SRU 10 may be removed by conventional separation techniques. Such sulfur contaminant should be removed prior to dehydration of the tail gas in order to avoid a water and sulfur mixture which is difficult to handle.

The tail gas from the SRU 10 may be hydrogenated prior to delivery to the dehydrator 12. This may be done in a known manner by passing the tail gas through a catalytic bed to convert any remaining sulfur dioxide and sulfur to hydrogen sulfide.

The tail gas in the line 26 is delivered to dehydrator 12 for removal of water. Essentially, all of the water is separated and removed via line 28. In accordance with the assumed feed gas composition and use of a single thermal reaction stage in the SRU 10 to provide 52% conversion, the composition of the dehydrated tail gas withdrawn via line 30 is as follows.

| COMPONENT | MOL PERCENT |
| --- | --- |
| carbon dioxide | 31.3% |
| hydrogen sulfide | 65.4% |
| sulfur dioxide | 1.4% |
| nitrogen | 1.9% |

The nitrogen content is derived from the oxidizing agent and any nitrogen present in the process feed stream.

The dehydrated tail gas is withdrawn from the dehydrator 12 through line 30 and passed to indirect heat exchanger 32 for cooling. The dehydrated tail gas is cooled in heat exchanger 32 to a temperature below its dew point to provide a gas/liquid mixture. For example, cooling to about −55° C. at a pressure of about 110 psia will provide a gas/liquid mixture which may be introduced into absorber 14 via line 34.

In the absorber 14, liquid carbon dioxide absorbent delivered via line 36 absorbs sulfur-containing compounds from the upwardly flowing gaseous portion of the dehydrated tail gas. Accordingly, a purified tail gas essentially free of sulfur-containing compounds is withdrawn through line 38 from the absorber 14. The purified tail gas stream contains essentially only carbon dioxide and nitrogen. Less than one ppm of sulfur-containing compound in the purified tail gas stream is achieved easily in accordance with the disclosed process. Essentially 100% sulfur recovery can be achieved since all of the sulfur-containing compounds in the tail gas are absorbed by the liquid carbon dioxide and recycled to the Claus reaction. Accordingly, sulfur recovery is not restricted by Claus reaction thermodynamics or kinetics.

The spent liquid carbon dioxide absorbent including absorbed sulfur-containing compounds is withdrawn from the absorber 14 through line 40 and introduced into the crystallizer 16 for purification. The liquid carbon dioxide and sulfur-containing compounds mixture provides the crystallizable liquid phase in the crystallizer. As described in greater detail below, the sulfur-containing compounds are excluded from the solid phase formed upon freezing the liquid phase in the crystallizer 16 to produce the recycle stream in line 18. Purified liquid carbon dioxide is passed through line 36 to the absorber 14 for reuse.

In the absence of a nitrogen constituent or other low boiling component, the absorber 14 may be eliminated and the dehydrated tail gas may be passed directly to the crystallizer 16 via lines 34 and 34(a), the latter being shown in dashed form in FIG. 1. Such a system also requires a pure oxygen oxidizing agent. Any excess carbon dioxide may be vented after its purification in the crystallizer 16. Any additional excess carbon dioxide not required in the absorption process may be withdrawn through line 36a as a liquid carbon dioxide product.

As indicated above, triple point crystallization is preferred for subsequent purification of the spent absorbent and concentration of the recycle stream to be combined with the process feed stream. Triple point crystallization is applicable to the carbon dioxide and sulfur-containing compound mixture since such displays a unique pressure and temperature at which solid, liquid and gas phases coexist in equilibrium with each other in accordance with the conventional meaning of the term triple point.

In the illustrated system, carbon dioxide is the crystallizable material and the sulfur-containing compounds are impurities or excluded materials. An in situ heat transfer material or component is also used. The cooling to form the solid phase is provided by evaporation of the in situ heat transfer component and the heating to melt the solid phase is provided by condensation of a vapor phase of the heat transfer component.

In the crystallization process, the solid phase may be formed and melted at spaced zones located in the liquid phase. The solid phase is washed as it settles through the liquid phase intermediate the two zones. A condensing vapor is introduced into the melt zone for melting the submerged solid phase. Such a technique is particularly described in assignee's U.S. Pat. No. 4,609,388. Alternatively, a drained bed technique may be used wherein the solid phase is melted in a drained bed after separation from the liquid phase. The melt liquid drains through the bed without accumulation and the bed is substantially free of liquid during the melting step. Such a drained bed process is particularly described in assignee's U.S. Pat. No. 4,623,372.

Each of the foregoing crystallization processes is a continuous separation cascade which operates mainly at temperatures and pressures near carbon dioxide triple point conditions. Small pressure differences through the cascade drive the process causing carbon dioxide to alternately freeze and melt at different locations in the cascade to establish concentration gradients and flows of crystallizable and excluded materials. Extremely pure carbon dioxide may be achieved by only a few stages of crystallization, e.g. 1 ppm of excluded material.

Figure 2:
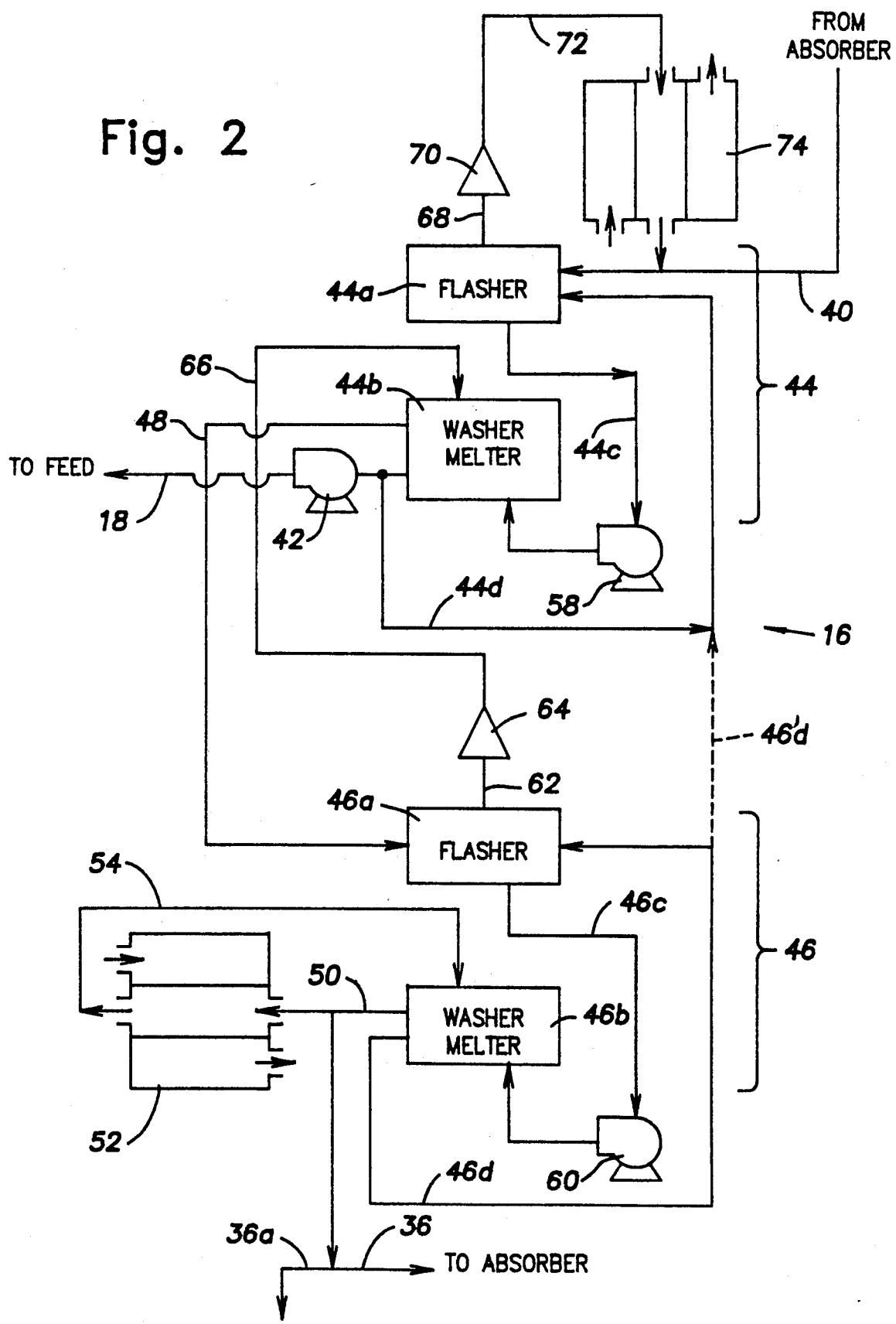
FIG. 2 is a more detailed process flow diagram showing a crystallization process used in the sulfur recovery process of FIG. 1.

Referring to FIG. 2, a more detailed process flow diagram of the crystallizer 16 is shown with the use of the same reference numerals to identify corresponding parts described above in connection with FIG. 1. The crystallizer 16 includes two series-connected stages 44 and 46, respectively. Stage 44 includes a flasher vessel 44a and associated washer-melter vessel 44b. Similarly, stage 46 includes flasher vessel 46a and washer-melter vessel 46b.

In each washer-melter vessel, a rising bed of carbon dioxide is formed and melted to provide a crystallizable material-enriched output which is withdrawn via lines 48 and 50, respectively. Thus, a stream of purified carbon dioxide is withdrawn from the washer-melter 44b through line 48 and passed to flasher 46a. A further purified stream of liquid carbon dioxide is withdrawn from the washer-melter 46b through line 50. A portion of the purified carbon dioxide in line 50 is vaporized in indirect heat exchanger 52 and returned via line 54 to the washer-melter 46b to provide a condensing vapor for further melting of the rising bed of carbon dioxide therein. The remaining portion of the purified liquid carbon dioxide withdrawn through line 50 provides a purified supply of absorbent passed via line 36 to the absorber 14.

Evaporative cooling of the liquids in each of the flashers 44a and 46a produces a solid phase enriched in carbon dioxide. The solid phases are respectively delivered to the associated washer-melters as a slurry via lines 44c and 46c and inline pumps 58 and 60, respectively. The liquid phase or carrier fluids of the slurries are separated from the solid phases in each of the washer-melters 44b and 46b and returned to the associated flasher via lines 44d and 46d, respectively.

The evaporative cooling in the flasher 46a produces an excluded material-enriched overhead vapor product withdrawn through line 62 and compressed by means of compressor 64 to provide a condensing vapor delivered via line 66 to the washer-melter 44b for melting the drained bed of carbon dioxide formed therein. This vapor flow also serves to upwardly convey the excluded sulfur-containing compounds to the adjacent higher stage 44. This upward flow may be supplemented by a liquid flow provided by passing a portion of the liquid flow in line 46'd through line 46'd (shown in dotted outline) to line 44d and then to flasher 44a.

Evaporative cooling in the flasher 44a produces an overhead vapor product having a high concentration of excluded material. The overhead product is withdrawn from the flasher 44a through line 68 and compressed by inline compressor 70. The overhead product is then passed via line 72 to indirect heat exchanger 74 wherein it is condensed and thereafter returned to the flasher 44a. It should be appreciated that heat exchangers 74 and 52 may comprise a single unit.

The excluded material-enriched liquid withdrawn from washer-melter 44b is divided between line 44d and the recycle stream in line 18 including inline pump 42. The concentration of the excluded material or sulfur-containing compounds in this stream is approximately 78.6% hydrogen sulfide and 1.7% sulfur dioxide as indicated above. In this manner, a hydrogen sulfide-rich feed is maintained in the Claus reaction within the SRU 10.

Throughout the cascade of the crystallizer 16, crystalline carbon dioxide is formed and moved in a downward direction and hydrogen sulfide and other sulfur-containing compounds excluded from the crystalline carbon dioxide is moved in an upward direction. In the system, the in situ heat transfer component is primarily carbon dioxide with a lesser content of the excluded material. There is an upwardly progressing depression of triple points of the mixtures in the system, due to the increasing concentration of excluded material. Accordingly, upwardly decreasing temperature and pressure operating conditions are established in the cascade. For example, the pressure may be about 15 psia and the temperature $-82°$ C. in the flasher 44a. In flasher 46a, the pressure will be in the order of 75 psia and the temperature about $-57°$ C.

Figure 3:
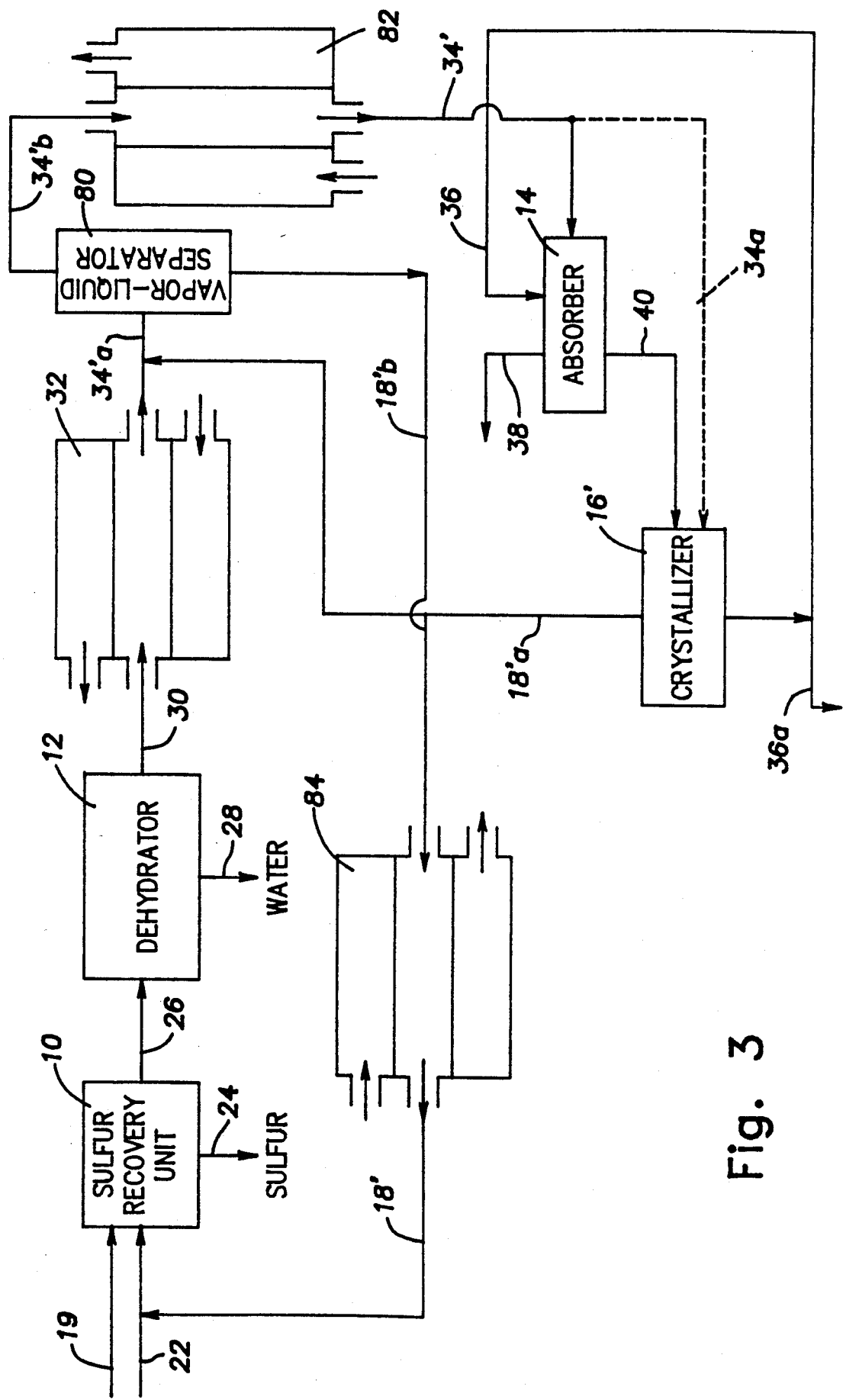
FIG. 3 is a simplified process flow diagram showing the sulfur recovery process of FIG. 1 modified to include vapor-liquid equilibrium separation for further concentrating an excluded material-enriched output from the crystallization process.

Referring to FIG. 3, a simplified process flow diagram shows the sulfur recovery process of FIGS. 1 and 2 modified to include vapor-liquid equilibrium separation to produce a recycle stream of the desired composition, i.e. approximately 80% sulfur-containing compounds which primarily consist of hydrogen sulfide. In this modified process, the concentrating of the sulfur-containing compounds in the recycle stream is completed externally of the crystallizer. Accordingly, the recycle stream has a higher concentration of sulfur-containing compounds than exists at any location in the crystallization process.

The use of vapor-liquid separation equilibrium takes advantage of the effective separation of carbon dioxide from hydrogen sulfide at higher concentrations of the latter, e.g. exceeding 50%. The use of such a separation technique is less costly and more energy efficient as described below. In view of the similar processing or apparatus used in the modified process, the foregoing reference numerals are used for corresponding process steps or apparatus with the addition of prime designations in certain instances. Further, the foregoing detailed description is relied upon in the following discussion which is primarily directed to the modifications of the process.

In the modified process of FIG. 3, a vapor-liquid separator 80 receives a partially condensed flow of dehydrated tail gas from the heat exchanger 32 through line 34'a and an excluded material-enriched output from the crystallizer 16' through line 18'a which are separated into vapor and liquid phases. The liquid phase is withdrawn through line 18'b to provide a recycle flow of sulfur-containing compounds to the SRU 10. The vapor phase is withdrawn through line 34'b as a residual tail gas. The residual tail gas is cooled in indirect heat exchanger 82 to provide a vapor and liquid flow thereof for delivery to the absorber 14 through line 34'.

Figure 4:
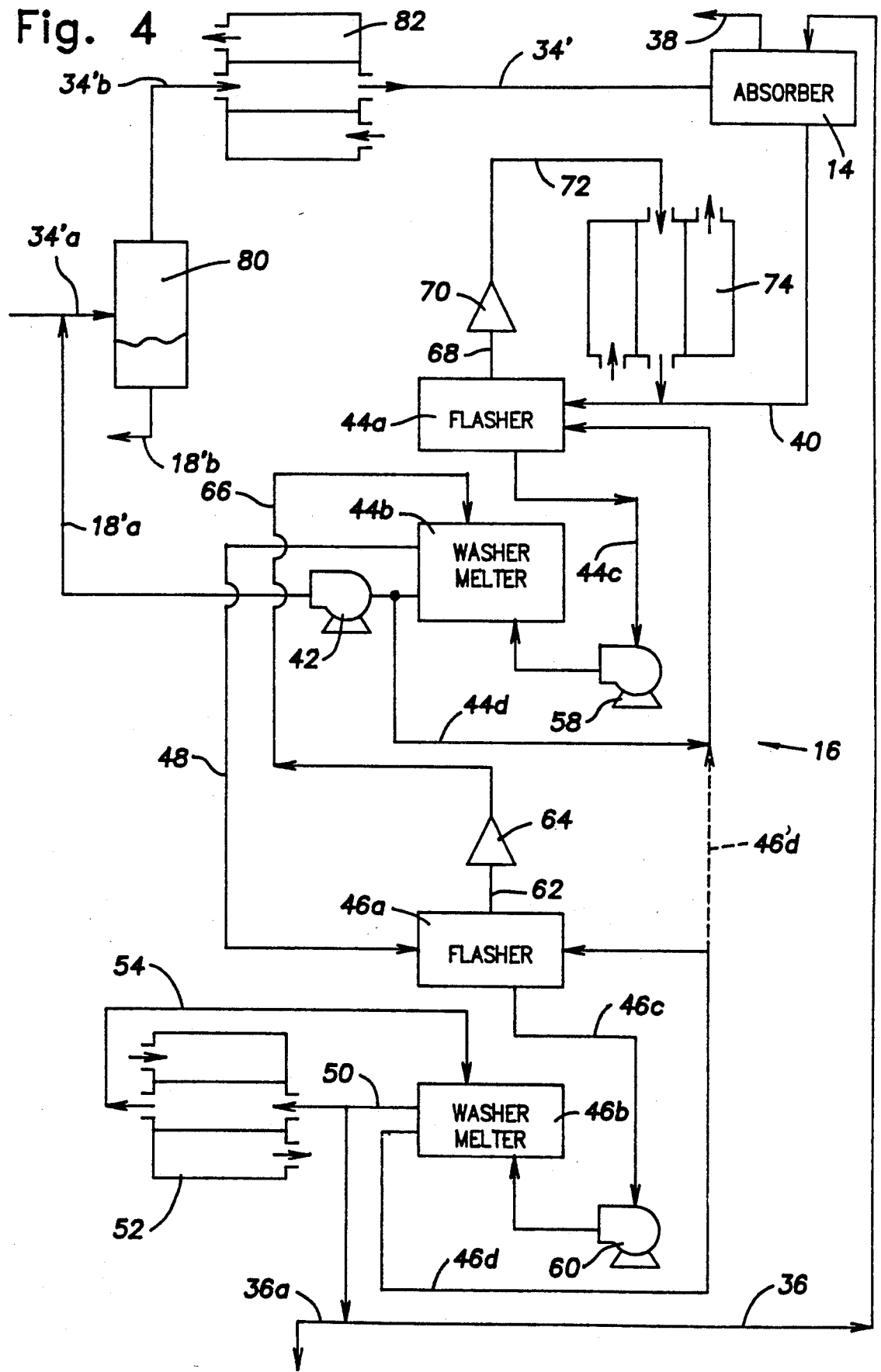
FIG. 4 is a more detailed process flow diagram showing the crystallization process and vapor-liquid equilibrium separation.

Referring to FIG. 4, further details of the separator 80 and crystallizer 16' are shown with the use of the same reference numerals to identify corresponding parts described above in connection with the first embodiment of FIGS. 1 and 2. As indicated above, the dehydrated tail gas is cooled to below its dew point in heat exchanger 32 (FIG. 3) to provide a vapor/liquid mixture at a temperature of about $-30°$ C. and a pressure of 137 psia. The overall composition of the flow is about 65.4% hydrogen sulfide. The excluded material-enriched output from washer-melter 44b is delivered to the separator 80 via line 18'a as a liquid containing about 50% hydrogen sulfide at a temperature of $-70°$ C. and a pressure of about 137 psia. The dehydrated tail gas and the excluded material-enriched output from the washer-melter are delivered to the separator 80 via line 34'a.

As schematically indicated in FIG. 4, the vapor and liquid components of the mixture of materials delivered via lines 34'a and 18'a are separated with the vapor phase being in equilibrium with the liquid phase. The liquid phase has a concentration of about 80% hydrogen sulfide and it is withdrawn through line 18'b and delivered to indirect heat exchanger 84 (FIG. 3) for heating and vaporization with recovery of its refrigeration energy. The vaporized liquid is then delivered through line 18' (FIG. 3) as a gaseous recycle stream to the SRU 10 (FIG. 3).

The vapor phase is withdrawn from the separator 80 as a residual dehydrated tail gas containing about 40% hydrogen sulfide. The vapor is saturated and it is cooled in the heat exchanger 82 to provide a vapor/liquid mixture which is delivered through line 34' to the absorber 14.

In the flasher 44a of FIG. 4, the liquid composition is about 50% hydrogen sulfide. Accordingly, the temperature is about $-70°$ C. and the pressure is about 30 psia which correspond with the triple point conditions at such concentration of hydrogen sulfide. In contrast, the pressure in the flasher 44a (FIG. 2) in the process of FIGS. 1 and 2 is about 15 psia since the hydrogen sulfide concentration is about 80% therein. Accordingly, the vapor withdrawn through line 68 in the process of FIGS. 1 and 2 must be compressed an additional 15 psia by the compressor 70 (FIG. 2) since the triple point pressure is depressed by the increased hydrogen sulfide concentration. The use of the separator 80 to complete the concentration of the sulfur-containing compounds in the recycle stream externally of the crystallizer 16' thereby increases the minimum triple-point pressure therein and reduces the amount of compressor work required. Therefore, it is more energy and cost efficient in accordance with the embodiment of FIGS. 3 and 4 to utilize a vapor-liquid equilibrium separation in separator in 80 to concentrate the liquid phase to 80% hydrogen sulfide for recycle.

Figure 5:
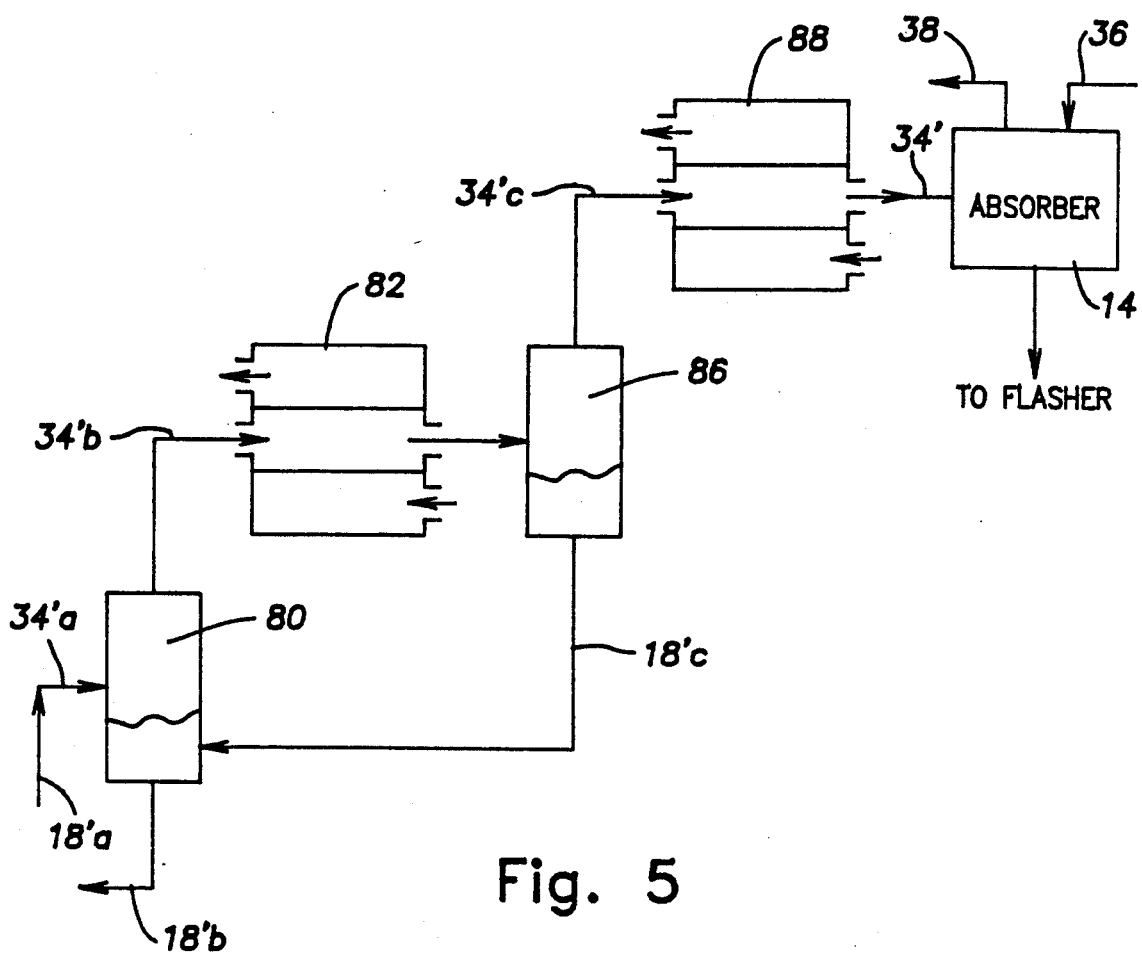
FIG. 5 is a detailed process flow diagram showing another embodiment of the vapor-liquid equilibrium separation.

In accordance with the economics of the particular separation, a second vapor-liquid separator 86 may be connected in series with the separator 80 as shown in FIG. 5 with the use of the same reference numerals to identify corresponding parts described above in connection with the embodiments of FIGS. 1 to 4. To that end, the vapor phase withdrawn through line 34'b is condensed in part using indirect heat exchange in heat exchanger 82 for delivery as a vapor/liquid mixture to the separator 86. The vapor phase withdrawn through line 34'c from the separator 86 contains about 20% hydrogen sulfide. The vapor is condensed in part using indirect heat exchange in heat exchanger 88 and thereafter delivered via line 34' to the absorber 14.

The liquid phase in separator 86 contains about 50% hydrogen sulfide. The liquid phase is passed via line 18'c to the separator 80.

Figure 6:
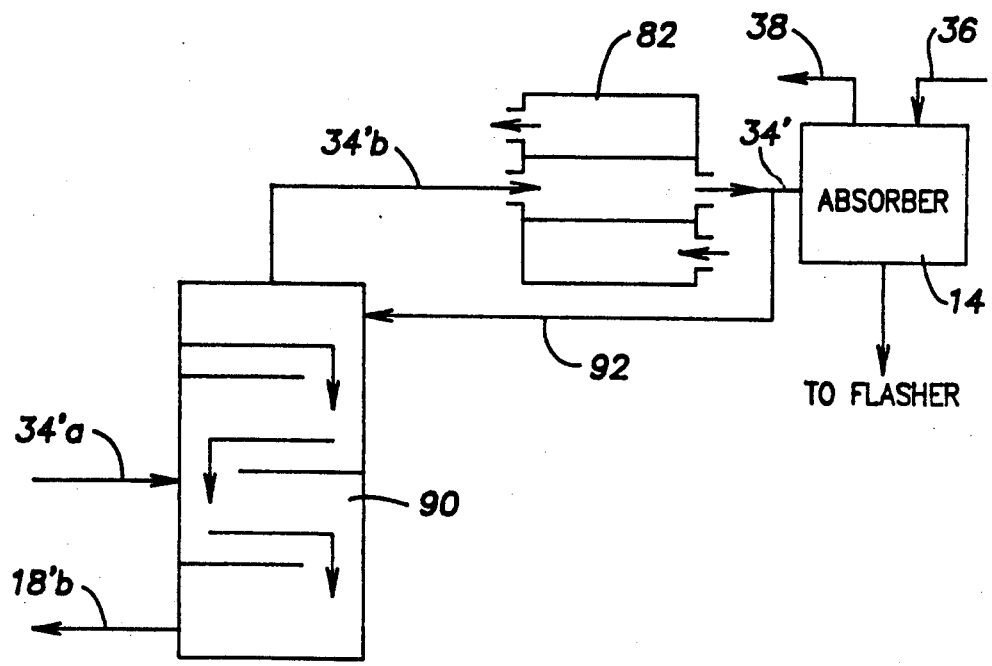
FIG. 6 is a detailed process flow diagram showing yet another embodiment of the vapor-liquid equilibrium separation.

As indicated above, the separator 86 operates as a second stage in combination with the separator 80. Accordingly, a distillation column 90 as shown in FIG. 6 may be used in place of series connected vapor-liquid separators 80 and 86. As schematically shown in FIG. 6 with the use of the same reference numerals to identify corresponding parts described above in connection with the embodiments of FIGS. 1 to 5, a three-tray column results in an overhead vapor removed via line 34'b. The vapor in line 34'b is condensed in heat exchanger 82. A portion of the condensed vapor is passed to the absorber 14 via line 34'. The remaining portion of the condensed vapor is returned via line 92 as a distillation recycle stream to the column 90. A liquid phase enriched in hydrogen sulfide is withdrawn from the bottom of the column via line 18'b for evaporation in heat exchanger 84 (FIG. 3) and recycled via line 18' to the SRU 10.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream comprising the steps of:
   (a) providing a Claus feed stream containing a stoichiometric excess of hydrogen sulfide, said Claus feed stream including said process feed stream and said recycles stream;
   (b) introducing said Claus feed stream and an oxidizing agent into a sulfur recovery unit for converting sulfur-containing compounds in the Claus feed stream to elemental sulfur and producing a tail gas containing unconverted sulfur-containing compounds including carbonyl sulfide using the Claus reaction;
   (c) withdrawing said tail gas from said sulfur recovery unit;
   (d) separating water from said tail gas to producing a dehydrated tail gas;
   (e) separating sulfur-containing compounds including carbonyl sulfide from said dehydrated tail gas as an excluded material by crystallization and withdrawing an excluded material-enriched output from the crystallization to produce said recycle stream; and
   (f) combining said recycle stream with said process feed stream to produce said Claus feed stream in step (a).

2. The method of claim 1, wherein said crystallization of step (e) is a triple point crystallization process.

3. The method of claim 2, wherein step (e) includes initially contacting said dehydrated tail gas with a liquid carbon dioxide absorbent to produce a purified gas stream for venting and spent absorbent including absorbed sulfur-containing compounds, and then separating said sulfur-containing compounds as an excluded material from said crystallizable material by crystallization, carbon dioxide being separated as a purified crystallizable material-enriched output of said crystallization process.

4. The method of claim 3, including using at least a portion of the purified carbon dioxide crystallizable material as the liquid carbon dioxide absorbent.

5. The method of claim 4, wherein said excluded material-enriched output comprises a liquid stream withdrawn from said crystallization process to produce said recycle stream.

6. The method of claim 4, wherein said excluded material-enriched output comprises a vapor stream withdrawn from said crystallization process to produce said recycle stream.

7. The method of claim 1, wherein said Claus reaction comprises a single thermal reaction stage.

8. The method of claim 1, wherein step (c) includes hydrogenating said tail gas.

9. The method of claim 1, wherein said unconverted sulfur-containing compounds in said tail gas comprise from about 70% to about 99% hydrogen sulfide.

10. The method of claim 1, wherein said sulfur-containing compounds in said tail gas of step (b) and dehydrated tail gas of step (e) include hydrogen sulfide, sulfur and sulfur dioxide.

11. The method of claim 3, wherein step (b) includes converting from about 50% to about 85% of the sulfur-containing compounds in said Claus feed stream to elemental sulfur using the Claus reaction in said sulfur recovery unit, and step (f) includes returning in said recycle stream substantially all of said unconverted sulfur-containing compounds in said tail gas to said sulfur recovery unit to thereby provide substantially 100% recovery of the sulfur-containing compounds in said process feed stream.

12. A method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream comprising the steps of:
   (a) providing a Claus feed stream containing a stoichiometric excess of hydrogen sulfide, said Claus feed stream including said process feed stream and said recycle stream;
   (b) introducing said Claus feed stream and an oxidizing agent into a sulfur recovery unit for converting sulfur-containing compounds in the Claus feed stream to elemental sulfur and producing a tail gas containing unconverted sulfur-containing compounds including carbonyl sulfide using the Claus reaction;
   (c) withdrawing said tail gas from said sulfur recovery unit with unconverted hydrogen sulfide being the primary sulfur-containing compound in said tail gas;
   (d) separating water from said tail gas to produce a dehydrated tail gas and contacting said dehydrated tail gas with a liquid carbon dioxide absorbent to produce a purified gas stream for venting and spent absorbent including absorbed sulfur-containing compounds including carbonyl sulfide;
   (e) crystallizing said spent absorbent to separate sulfur-containing compounds as an excluded material from a solid phase containing carbon dioxide and withdrawing an excluded material-enriched output from the crystallization of step (e) to produce said recycle stream; and
   (f) combining said recycle stream with said process feed stream to produce said Claus feed stream in step (a).

13. The method of claim 12, wherein said crystallization of step (e) is a triple point crystallization process.

14. The method of claim 13, wherein step (e) includes separating carbon dioxide as a purified crystallizable material-enriched output of said crystallization process.

15. The method of claim 14, including using at least a portion of the purified carbon dioxide crystallizable material as the liquid carbon dioxide absorbent.

16. The method of claim 15, wherein said Claus reaction comprises a single thermal reaction stage.

17. The method of claim 16, wherein step (c) includes hydrogenating said tail gas.

18. The method of claim 12, wherein said unconverted sulfur-containing compounds in said tail gas comprise from about 70% to about 99% hydrogen sulfide.

19. The method of claim 12, wherein said sulfur-containing compounds in said tail gas of step (b) and spent absorbent of step (d) include hydrogen sulfide, and sulfur dioxide.

20. The method of claim 12, wherein step (b) includes converting from about 50% to about 85% of the sulfur-containing compounds in said Claus feed stream to elemental sulfur using the Claus reaction in said sulfur recovery unit, and step (f) includes returning in said recycle stream substantially all of said unconverted sulfur-containing compounds in said tail gas to said sulfur recovery unit to thereby provide substantially 100% recovery of the sulfur-containing compounds in said process feed stream.

21. A method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream comprising the steps of:
(a) providing a Claus feed stream containing a stoichiometric excess of hydrogen sulfide, said Claus feed stream including said process feed stream and said recycle stream;
(b) introducing said Claus feed stream and an oxidizing agent into a sulfur recovery unit for converting sulfur-containing compounds in the Claus feed stream to elemental sulfur and producing a tail gas containing unconverted sulfur-containing compounds using the Claus reaction;
(c) withdrawing said tail gas from said sulfur recovery unit;
(d) separating water from said tail gas to produce a dehydrated tail gas and forming a crystallizable liquid phase including at least a portion of the sulfur-containing compounds contained in said dehydrated tail gas;
(e) separating sulfur-containing compounds from said crystallizable liquid phase as an excluded material by crystallization and withdrawing an excluded material-enriched output from the crystallization to produce said recycle stream; and
(f) combining said recycle stream with said process feed stream to produce said Claus feed stream in step (a).

22. The method of claim 21, wherein the step of forming said crystallizable liquid phase includes contacting said dehydrated tail gas with a liquid carbon dioxide absorbent to produce a purified gas stream suitable for venting to the atmosphere and spent absorbent including absorbed sulfur-containing compounds to provide said crystallizable liquid phase.

23. A method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream comprising the steps of:
(a) providing a Claus feed stream containing a stoichiometric excess of hydrogen sulfide, said Claus feed stream including said process feed stream and said recycle stream;
(b) introducing said Claus feed stream and an oxidizing agent into a sulfur recovery unit for converting sulfur-containing compounds in the Claus feed stream to elemental sulfur and producing a tail gas containing unconverted sulfur-containing compounds using the Claus reaction;
(c) withdrawing said tail gas from said sulfur recovery unit;
(d) separating water from said tail gas to produce a dehydrated tail gas;
(e) combining said dehydrated tail gas of step (d) with an excluded material-enriched output of a crystallization process of step (f) to form a mixture thereof, separating a vapor phase from a liquid phase of said mixture using vapor-liquid equilibrium separation to concentrate sulfur-containing compounds in said liquid phase, withdrawing said vapor phase to produce a residual dehydrated tail gas for processing in said crystallization process and withdrawing said liquid phase to produce said recycle stream with a higher concentration of sulfur-containing compounds than occurs in said crystallization process of step (f);
(f) separating sulfur-containing compounds from said residual dehydrated tail gas as an excluded material by crystallization and withdrawing said excluded material-enriched output from the crystallization for use in step (e); and
(g) combining said recycle stream with said process feed stream to produce said Claus feed stream in step (a).

24. The method of claim 23, wherein the step of separating a vapor phase from a liquid phase of said mixture includes introducing said dehydrated tail gas from step (d) and said excluded material-enriched output from step (f) into a flash drum to form said vapor phase above said liquid phase.

25. The method of claim 24, wherein said first-mentioned flash drum is connected in series with a second flash drum, said vapor phase from said first flash drum being cooled to a temperature below its dew point and introduced into said second flash drum for separating a second vapor phase from a second liquid phase, said second liquid phase being recycled to the first-mentioned flash drum for combination with said first-mentioned liquid phase.

26. The method of claim 23, wherein the step of separating a vapor phase from a liquid phase of said mixture includes introducing said dehydrated tail gas from step (d) and said excluded material-enriched output from step (f) into a distillation column and withdrawing an overhead vapor product to form said vapor phase and withdrawing a liquid bottom product to form said liquid phase.

27. The method of claim 23, wherein step (e) includes contacting said residual dehydrated tail gas with a liquid carbon dioxide absorbent to produce a purified gas stream for venting and spent absorbent including absorbed sulfur-containing compounds, and then separating said sulfur-containing compounds as excluded material from said crystallizable material by said crystallization, carbon dioxide being separated as a purified crystallizable material-enriched output of said crystallization process.

28. The method of claim 27, including using at least a portion of the purified carbon dioxide crystallizable material as the liquid carbon dioxide absorbent.

29. The method of claim 28, wherein said unconverted sulfur-containing compounds in said tail gas of step (b) and residual dehydrated tail gas of step (f) includes hydrogen sulfide, sulfur dioxide and carbonyl sulfide.

30. A method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream comprising the steps of:

(a) providing a Claus feed stream containing a stoichiometric excess of hydrogen sulfide, said Claus feed stream including said process feed stream and said recycle stream;

(b) introducing said Claus feed stream and an oxidizing agent into a sulfur recovery unit for converting sulfur-containing compounds in the Claus feed stream to elemental sulfur and producing a tail gas containing unconverted sulfur-containing compounds using the Claus reaction;

(c) withdrawing said tail gas from said sulfur recovery unit;

(d) separating water from said tail gas to produce a dehydrated tail gas and forming a crystallizable liquid phase including at least a portion of the sulfur-containing compounds contained in said dehydrated tail gas;

(e) combining said dehydrated tail gas of step (d) with an excluded material-enriched output of a crystallization process of step (f) to form a mixture thereof, separating a vapor phase from a liquid phase of said mixture using vapor-liquid equilibrium separation to concentrate sulfur-containing compounds in said liquid phase, withdrawing said vapor phase to produce a residual dehydrated tail gas for processing as said crystallizable liquid phase in said crystallization step and withdrawing said liquid phase to produce said recycle stream with a higher concentration of sulfur-containing compounds than occurs in said crystallization process of step (f);

(f) separating sulfur-containing compounds from said crystallizable liquid phase as an excluded material by crystallization and withdrawing excluded material-enriched output from the crystallization for use in step (e); and (g) combining said recycle stream with said process feed stream to produce said Claus feed stream in step (a).

31. The method of claim 30, wherein the step (e) includes contacting said residual dehydrated tail gas with a liquid carbon dioxide absorbent to produce a purified gas stream for venting and spent absorbent including absorbed sulfur-containing compounds to provide said crystallizable liquid phase.

32. The method of claim 30, wherein the step (e) includes contacting said residual dehydrated tail gas with a physical absorbent to absorb sulfur-containing compounds therein and form said crystallizable liquid phase.

33. In a method for recovering sulfur from a process feed stream mixture of gases comprising sulfur-containing compounds including hydrogen sulfide using the Claus reaction to convert sulfur-containing compounds to elemental sulfur and crystallization to separate sulfur-containing compounds from a tail gas of the Claus reaction for further processing as a recycle stream, the improvement comprising forming a mixture by combining said tail gas from said Claus reaction with an excluded material-enriched output from said crystallization, said excluded material-enriched output containing separated sulfur-containing compounds, and separating a vapor phase from a liquid phase of said mixture using vapor-liquid equilibrium separation to concentrate sulfur-containing compounds in said liquid phase, said separated vapor phase forming a residual tail gas stream for further processing in said crystallization and said separated liquid phase forming said recycle stream.

34. The method of claim 33, wherein the step of separating a vapor phase from a liquid phase of said mixture includes introducing said tail gas from said Claus reaction and said excluded material-enriched output from said crystallization into a flash drum to form said vapor phase above said liquid phase.

35. The method of claim 34, wherein said first-mentioned flash drum is connected in series with a second flash drum, said vapor phase from said first flash drum being cooled to a temperature below its dew point and introduced into said second flash drum from separating a second vapor phase from a second liquid phase, said second liquid phase being recycled to the first-mentioned flash drum for combination with said first-mentioned liquid phase.

36. The method of claim 33, wherein the step of separating a vapor phase from a liquid phase of said mixture includes introducing said tail gas from said Claus reaction and said excluded material-enriched output from said crystallization into a distillation column and withdrawing an overhead vapor product to form said vapor phase and withdrawing a liquid bottom product to form said liquid phase.

* * * * *